(12) United States Patent
Zheng et al.

(10) Patent No.: US 9,714,191 B2
(45) Date of Patent: Jul. 25, 2017

(54) PROCESS FOR COATING A GLASS SUBSTRATE WITH AN AQUEOUS FLUOROPOLYMER COATING

(71) Applicant: Arkema Inc., King of Prussia, PA (US)

(72) Inventors: Min Zheng, Berwyn, PA (US); Mei Wen, Chesterbrook, PA (US); Scott R. Gaboury, Blue Bell, PA (US); Kurt A. Wood, Abington, PA (US); Ronald H. Partridge, Royersford, PA (US)

(73) Assignee: Arkema Inc., King of Prussia, PA (US)

( * ) Notice: Subject to any disclaimer, the term of this patent is extended or adjusted under 35 U.S.C. 154(b) by 331 days.

(21) Appl. No.: 14/394,304

(22) PCT Filed: Apr. 2, 2013

(86) PCT No.: PCT/US2013/034886
§ 371 (c)(1),
(2) Date: Oct. 14, 2014

(87) PCT Pub. No.: WO2013/158361
PCT Pub. Date: Oct. 24, 2013

(65) Prior Publication Data
US 2015/0086792 A1  Mar. 26, 2015

Related U.S. Application Data

(60) Provisional application No. 61/625,245, filed on Apr. 17, 2012.

(51) Int. Cl.
| | | |
|---|---|---|
| *B05D 1/38* | (2006.01) | |
| *B05D 3/02* | (2006.01) | |
| *C03C 17/34* | (2006.01) | |
| *C09D 175/04* | (2006.01) | |
| *C08G 18/62* | (2006.01) | |
| *C08G 18/70* | (2006.01) | |
| *C08G 18/75* | (2006.01) | |
| *C08G 18/28* | (2006.01) | |
| *C08G 18/48* | (2006.01) | |
| *B05D 3/00* | (2006.01) | |
| *C08G 18/80* | (2006.01) | |
| *C08G 18/10* | (2006.01) | |
| *C08G 18/32* | (2006.01) | |
| *C03C 25/50* | (2006.01) | |

(52) U.S. Cl.
CPC .......... *C03C 17/3405* (2013.01); *B05D 3/007* (2013.01); *B05D 3/0254* (2013.01); *C03C 25/50* (2013.01); *C08G 18/10* (2013.01); *C08G 18/289* (2013.01); *C08G 18/2885* (2013.01); *C08G 18/3206* (2013.01); *C08G 18/48* (2013.01); *C08G 18/6279* (2013.01); *C08G 18/706* (2013.01); *C08G 18/758* (2013.01); *C08G 18/80* (2013.01); *C09D 175/04* (2013.01); *B05D 1/38* (2013.01); *Y10T 428/3154* (2015.04)

(58) Field of Classification Search
CPC ................................................ C03C 17/3405
See application file for complete search history.

(56) References Cited

U.S. PATENT DOCUMENTS

| | | |
|---|---|---|
| 4,879,345 A | 11/1989 | Connelly et al. |
| 5,852,106 A | 12/1998 | Wilmes et al. |
| 2004/0019145 A1 | 1/2004 | Imoto et al. |
| 2005/0038187 A1 | 2/2005 | Mano et al. |
| 2005/0165195 A1 | 7/2005 | Tsuchida et al. |
| 2005/0208312 A1 | 9/2005 | Hazan et al. |
| 2007/0166469 A1 | 7/2007 | Snow et al. |
| 2008/0268259 A1* | 10/2008 | Schmatloch ........... C08G 18/10 428/423.1 |
| 2011/0045219 A1 | 2/2011 | Stewart et al. |
| 2011/0118403 A1 | 5/2011 | Wood et al. |

FOREIGN PATENT DOCUMENTS

| | | | |
|---|---|---|---|
| CA | 2091847 | 10/1993 | |
| EP | 1593720 | 11/2005 | |
| WO | WO 0198393 A1 * | 12/2001 | ........... C08G 18/809 |

* cited by examiner

*Primary Examiner* — Ramsey Zacharia
(74) *Attorney, Agent, or Firm* — Thomas F. Roland

(57) ABSTRACT

The invention relates to an process for coating a glass substrate with an environmentally friendly aqueous, fluoropolymer coating composition. The process involves applying a polyurethane primer to the glass substrate, and partially, but not completely crosslinking this primer coating. An aqueous hydroxyl-functional fluoropolymer coating is then applied to the partially crosslinked primer coating, and the coating allowed to fully cure. The invention also relates to the intertwined multilayer primer/fluoropolymer coating on the glass substrate. The final coating has excellent wet adhesion to glass, good weathering, durability, chalking resistance, chemical resistance, and dirt pickup resistance.

12 Claims, No Drawings

PROCESS FOR COATING A GLASS SUBSTRATE WITH AN AQUEOUS FLUOROPOLYMER COATING

This application claims benefit, under U.S.C. §119 or §365 of PCT Application No. PCT/US2013/034886, filed Apr. 2, 2013, and U.S. Provisional Application No. 61/625,245, filed Apr. 17, 2012, said applications incorporated herein by reference.

FIELD OF THE INVENTION

The invention relates to a process for coating a glass substrate with an environmentally friendly aqueous, fluoropolymer coating composition. The process involves applying a polyurethane primer to the glass substrate, and partially, but not completely reacting this primer coating. An aqueous hydroxyl-functional fluoropolymer coating is then applied to the partially reacted primer coating, and the coating allowed to fully cure. The invention also relates to the intertwined multilayer primer/fluoropolymer coating on the glass substrate. The final coating has excellent wet adhesion to glass, good weathering, durability, chalking resistance, chemical resistance, and dirt pickup resistance.

BACKGROUND OF THE INVENTION

Fluoropolymers have been used in many different high performance coating applications for over forty five years due to their excellent weathering properties which include gloss retention, color retention, chemical resistance, water resistance, chalking resistance and resistance to biological growth. Poly(vinylidene fluoride) (PVDF) has performed very well in architectural applications, where both excellent appearance and substrate protection must be maintained over long periods of time. The majority of fluoropolymer-based coatings are solvent based, producing high levels of volatile organic compounds (VOCs). Water-based coatings based on a fluoropolymer latex are attractive because they offer an environmentally friendly (low VOC) route to high performance coatings. For example, environmentally friendly coatings based on KYNAR AQUATEC® polyvinylidene fluoride-acrylic hybrid latexes (from Arkema Inc.), having a solid content of 42-45 wt %, exhibit better weatherability, dirt pick up resistance, stain resistance and chemical resistance than conventional acrylic, urethane and silicone coatings.

Because of their excellent properties, it is desirable to use fluoropolymer-based coating compositions to protect a variety of substrates. However, for some substrates such as glass the adhesion of the fluoropolymer based coating composition is quite limited due to the super-hydrophobicity of fluoropolymers. To achieve satisfactory adhesion of a fluoropolymer coating to glass, it is generally necessary to utilize some type of adhesive materials or to carry out costly and time-consuming glass treatments, such as surface etching, etc.

There is a need for an aqueous fluoropolymer-based coating composition that exhibits all of the desirable properties associated with a fluoropolymer coating and also has excellent adhesion directly to glass.

U.S. Pat. No. 4,879,345 describes a solvent-based coating composition based on polyvinylidene fluoride (PVDF) resin, that offers improved adhesion to glass substrates. To achieve good adhesion, the coating requires functional organosilanes and an adjuvant resin that reacts with the functional group on the organosilanes. The composition exhibited a good dry adhesion (adhesion tested before treatment with high humidity or water) directly to glass, but the wet adhesion (adhesion tested after treatment with high humidity or water) was unacceptable. The wet adhesion of the working examples after only 30 minutes soaking in boiling water was already less than 100%.

CA2091847 discloses a fluoropolymer based coating composition for glass substrates, which consists of a fluoropolymer resin, an organosilane and/or an organo-titanate, an inorganic pigment and a thermoplastic polyacrylate resin that has no functional groups reactive with the organosilane or organo-titanate. This composition is also organic solvent-based. The glass must be primed first with a clear coat which is a mixture of an organosilane and an organo-titanate. In addition, it is believed that the glass-to-coating bonding is a result of direct chemical bonding between the glass and some of the inorganic pigment particles. Therefore, CA2091847 applies only to coatings containing inorganic pigments and it does not apply to a clear top coat. Furthermore, wet adhesion of the coatings in CA2091847 was not reported. Both prior arts are solvent based coatings.

U.S. Pat. No. 5,852,106 describes an aqueous polyurethane binder for coating compositions and to their use for coating glass, preferably glass bottles. The binder contains a water-dispersed hydroxy-functional polyurethane dispersion and water dispersed blocked aliphatic polyisocyanate resin, wherein the equivalent ratio of blocked isocyanate groups to hydroxyl groups is at least 0.8:1. EP 519074 describes an aqueous glass coating composition that is applied in two coats, wherein the topcoat substantially contains three main components: a polyurethane dispersion, an aqueous epoxy resin and an aqueous melamine/a formaldehyde resin. While these, fully cross-linked coatings demonstrate excellent adhesion to glass, they do not have excellent weathering properties, chalking resistance and chemical resistance associated with fluoropolymer compositions.

Through diligent investigation it has been found that an environmentally friendly (low VOC) aqueous hydroxyl-functional fluoropolymer coating composition can be adhered to glass that has been primed with a polyurethane primer, and partially and not fully cross-linked. The multilayer coating composition provides excellent weathering properties, chalking resistance, chemical resistance and dirt pickup resistance. The coating composition is especially useful directly on glass substrates to provide a protective barrier with superior dry and wet adhesion.

SUMMARY OF THE INVENTION

The invention relates to a process for forming a fluoropolymer coating on a substrate comprising the steps of:

a) coating said substrate on at least one side or at least one edge with a primer composition comprising:
  1) at least one hydroxy-functional polyurethane,
  2) at least one polyisocyanate,
  3) at least one organosilane coupling agent,
  4) optionally an antioxidant
  5) optionally one or more additives selected from the group consisting of coalescent agents, pigments, dyes, wetting agents, UV absorbers, and heat stabilizers;

b) curing said primer composition to leave 15-90% of unreacted isocyanate or hydroxyl functional groups;

c) coating said primered substrate with an aqueous hydroxy-functional fluoropolymer composition comprising:
   1) a hydroxy-functional fluoropolymer,
   2) a hydrophilic aliphatic polyisocyanate,
   3) optionally one or more additives selected from the group consisting of pigments, coalescent agents, wetting agents, UV absorbers, and heat stabilizers; and
d) curing said coated substrate.

The invention further relates to an aqueous fluoropolymer coated substrate comprising a substrate having adhered to at least one surface a two layer coating where the first layer comprises
   1) at least one hydroxy-functional polyurethane,
   2) at least one polyisocyanate,
   3) at least one organosilane coupling agent,
   4) optionally one or more additives selected from the group consisting of coalescent agents, pigments, dyes, wetting agents, UV absorbers, and heat stabilizers;
and where the second layer comprises
   1) a hydroxy-functional fluoropolymer,
   2) a hydrophilic aliphatic polyisocyanate,
   3) optionally one or more additives selected from the group consisting of pigments, coalescent agents, wetting agents, UV absorbers, and heat stabilizers; and
wherein said first and second layers are chemically bonded at the interface.

DETAILED DESCRIPTION OF THE INVENTION

All references cited herein are incorporated by reference. Unless otherwise stated, all molecular weights are weight average molecular weights, and all percentages are percentage by weight.

The invention relates to a process for adhering an aqueous fluoropolymer composition to glass by first applying a primer, curing the primer so it is partially reacted, then applying an aqueous, hydroxyl-functional fluoropolymer coating and curing the coating.

Primer:

A hydroxyl functional urethane primer is first applied to a glass substrate, and then partially reacted. The primer contains a polyol, a polyisocyanate, and organosilanes. The primer can be an aqueous solution or dispersion, or can be in an organic solvent. A low VOC aqueous system is preferred for environmental reasons.

Polyol

The primer composition of the invention contains 0-40 wt %, and preferably 0.5-20 wt % (based on the weight of primer solids) of one or more water-dispersed or water-soluble polyols or hydroxyl-bearing polymers. These are added to the primer composition to adjust the properties of the coating, such as flexibility, toughness, and hydrolytical stability. The polyols can be either polyether polyols, polyurethane polyols, polyacrylate polyols, polyester polyols, polycarbonate polyols, or polycaprolactone polyols. Preferably, the polyols are polyether polyols due to their good resistance to hydrolysis. Polyurethane polyols produced by the addition of polyether polyols and diisocyanates (particularly those with aliphatic ones) with surplus amounts of diols and/or polyols are also preferred. One example of this kind of polyurethane polyol is BAYHYDROL VP LS 2239 (from Bayer).

One preferred hydroxy-functional polyurethane is one that is soluble or dispersible in water and is the reaction product of a polyisocyanate component containing 50 to 100 weight percent of 4,4'-diisocyanatodicyclohexylmethane, a polyol component containing one or more polyether polyols and having an OH number of between 25 to 350 mg KOH/g solids and an isocyanate-reactive compound containing at least one group capable of salt formation, such as that described in U.S. Pat. No. 5,852,106.

Polyisocyanate

Polyisocyanates of the invention provide two or more N=C=O groups. The isocyanate groups react with the hydroxyl group of the polyol to form a crosslinked, network that can help form a clear primer coating. The urethane linkage also improves the toughness of the coating material due to presence of hydrogen bonding. The toughness helps the coating's hydrolytical stability and wet adhesion. The material can easily relax stress developed due to dimension change occurred during swelling and shrinkage in a water immersion test and/or a temperature change. Therefore, no film delamination or cracking is introduced. The NCO groups also interact and likely further react with hydroxy functional (silanol) groups on the glass substrate, forming urethane linkages for strong interfacial bonding. The polyisocyanate can be a diisocyanate, an oligomeric isocyanate, or a polymeric isocyanate. Preferably the polyisocyanate is a polymeric isocyanate or oligomeric isocyanate—which are more flexible isocyanates. A simple diisocyantate is not preferred, as it would be quite rigid. The polyisocyanate can be aliphatic, such as those based on, for example, hexamethylene diisocyanate (HDI), bis-(4-isocyanatocyclohexyl) methane ($H_{12}$MDI), and isophorondiisocyanate (IPDI); or the polyisocyanate can be aromatic, such as those based on, for example, toluene diisocyanate (TDI) and methylene diphenyl diisocyanate (MDI).

If the polyisocyanate is to be used as part of a stable aqueous composition, then the isocyante group must be blocked. Polyisocyanates are typically blocked using blocking compound, such as phenols, pyridinols, thiophenols, mercaptopyridines, alcohols, mercaptans, oximes, amides, cyclic amides, imides, imidazoles, amidines, pyrazoles, 1,2, 4-triazoles, amines, and active methylene compounds. Examples of some commonly used blocking agents are ε-caprolactam, methyl ethyl ketoxime (butanone oxime), diethyl amine, dimethylpyrazole, malonic ester, 1,2,4-triazole, 3,5-dimethylpyrazole, and imidazole.

A blocked polyisocyanate releases its blocking agent in the presence of heat, and the resulting unblocked isocyanate group reacts with the hydroxyl groups to form a urethane linkage, or in the case of a methylene-blocked isocyanate a somewhat weaker ester linkage is formed. Different blocking agents are known to deblock at different temperatures, with alcohols deblocking at about 200° C., caprolactams and phenols about 170° C., oximes at about 140° C., pyrazoles about 130° C., and malonates about 110° C. Lower temperature deblocking (curing) is preferred in the invention, preferably where deblocking occurs at 150° C. or below, more preferably at 140° C. or below. In a one-pot aqueous composition of the invention, all polyisocyanates must be blocked to maintain a stable aqueous coating system.

When an organic solvent-based primer is used, one or more non-blocked polyisocyanates may be used. The advantage of the unblocked polyisocyanates is that they can react at lower temperatures.

Preferably at least 50% by weight, more preferably at least 70 weight percent, and most preferably at least 80 weight percent of the polyisocyanates used in the coating composition are flexible polyisocyanates.

One preferred blocked polyisocyanate is BAYHYDUR VP LS 2240 (from Bayer), which is a water-dispersed blocked aliphatic polyisocyanate resin based on dicyclohexylmethane diisocyanate (H12MDI). It provides good film flexibility and toughness that help the coating adhering to glass.

In another embodiment, the polyisocyanate described in U.S. Pat. No. 5,852,106, makes up at least 50%, and preferably at least 75%, and more preferably at least 90% by weight of the isocyanates in the coating composition. These isocyanates of the invention are water soluble or dispersible in water, have blocked isocyante groups, and is the reaction product of a polyisocyanate having an isocyante group content of 2 to 30 weight percent, a reversible, monofunctional blocking agent for isocyante groups, a nonionic hydrophilic component, and a stabilizing component which has 1 to 2 hydrazide groups and a molecular weight of 70 to 300.

In the primer coating composition, the molar ratio of the isocyanate groups to hydroxyl groups is in the range of 0.01 to 100, preferably in the range of 0.1 to 5, and more preferably in the range of 0.4 to 2.

Silane Coupling Agents

One or more organo silane coupling agents is used in the primer coating composition at from 0.01-10 wt %, based on polyol solids. The alkoxy groups in silane coupling agent can hydrolyze and then react with the hydroxyl groups on the glass surface to form interfacial chemical bonds Si—O—Si. The organic functional groups on the silane coupling agents can react with NCO groups in the coating.

Suitable silane coupling agents include alkoxy (such as methoxy or ethoxy) silanes with amino, thiol, sulfur, hydroxyl, anhydride, carboxylic acid, amide, isocyanate, masked isocyanate, and epoxy functional groups. Examples are 3-aminopropyltriethoxy silane, 3-aminopropyltrimethoxy silane, 4-aminobutyltriethoxysilane, bis(2-hydroxyethyl)-3-aminopropyltriethoxysilane, 3-(triethoxysilyl)propylsuccinic anhydride, 3-mercaptopropyl trimethoxysilane, 3-mercaptopropyl triethoxysilane, and 3-glycidoxypropyl trimethoxysilane, and 3-glycidoxypropyl triethoxysilane. In one embodiment, the organosilane coupling agent is a mixture of 3-mercaptopropyl trimethoxysilane and aminopropyltriethoxy silane with the ratio 0.1:1 to 10:1, and preferably at a range between 0.5:1 to 2:1. In a 2-pack coating system, the silanes are present in the aqueous portion, with the hydroxyl-functional fluoropolymer.

Optional Additives

The primer coating solution may also contain optional additives, to improve the coating wet adhesion when it is cured under high temperature such as IRGANOX 1010. It is a sterically hindered phenolic antioxidant, pentaerythritol tetrakis(3-(3,5-di-tert-butyl-4-hydroxyphenyl)propionate). It protects the coating material against thermo-oxidative degradation during the curing process of the coatings at high temperatures. It was discovered that it could improve the wet adhesion of a coating significantly. In one embodiment, IRGANOX 1010 is dissolved in methyl isoamyl ketone at 20% before added to the primer coating composition. The concentration of IRGANOX 1010 based on polyurethane solids is in the range of 0.1-10%, and preferably in the range of 0.5-5%. The coating composition may also contain additives to improve wetting, defoaming, and leveling properties.

The primer coating can be applied by a variety of methods including spraying, brushing, dipping and roll coating. The baking of the primer is dependent on the equivalent ratio of blocked and unblocked isocyanate groups to hydroxyl groups in the primer. If the ratio is low (e.g. <0.8) or high (>1.3), the primer can be cured under full baking condition, e.g. 150° C. for 30 minutes. However, if the ratio is close to 1, e.g. in the range of 0.9-1.1, the primer must be baked for insufficient time, for example the baking time should be cut from 30 minutes to 10 minutes.

The excellent wet adhesion of the fluoropolymer coating is achieved only when there are extra isocyanate or hydroxyl functional groups in the primer layer after its drying and curing to react with the hydroxyl or isocyante groups in the top fluoropolymer coating. The interfacial chemical bonding is formed in this manner.

The extra isocyanate or hydroxyl functional groups can be achieved through partially curing of the primer layer when the ratio of NCO:OH is close to 1, such as from 0.9-1.1, prior to applying the fluoropolymer based top coat. Preferably the extent of reaction between NCO and OH groups to form urethane linkage is less than 95%, more preferably less than 90%. If a blocked polyisocyanate is used in the primer, it was found that the primer coating should be baked at a sufficiently high temperature for good wet adhesion to glass. Not bounded by any particular theories, one hypothesis is that the blocking agent may not be able to come out of the primer during the drying and curing of the top fluoropolymer coating. The trapped blocking agent will adversely impact the wet adhesion of the coating. The primer coating should be baked at 80-180° C. for 0.1-15 minutes to release the blocking agent before applying the fluoropolymer coating. Preferably, the primer coating should be baked at 120-160° C. for 1-15 minutes. If the primer has too high a level of curing, the fluoropolymer coating will not be able to penetrate into the primer to form entanglements and a partial interpenetrating polymer network or crosslinking. The level of curing can be controlled by controlling the baking (curing) time and temperature.

The extra isocyanate or hydroxyl functional groups can also be achieved through providing excess amount of isocyanate or hydroxyl functional groups in the primer composition. When the NCO:OH ratio is farther away from 1, such as 0.4-0.9 or 1.1-2, the primer layer can be baked at a condition that will allow full consumption of the functional groups (isocyanate or hydroxyl groups) that are less in the composition. The primer coating can be cured fully at 120-180° C. for over 15 minutes. For instance, the primer coating can be baked at 150° C. for over 10 minutes, such as 30 minutes.

Fluoropolymer Coating Composition

The primed glass is subsequently coated with an aqueous fluoropolymer coating composition comprising a hydroxyl-functional fluoropolymer, an aliphatic polyisocyanate and optionally pigments and other conventional additives including coalescent agents, wetting agents, UV absorbers, heating stabilizers, etc. The equivalent ratio of the NCO groups to hydroxyl groups of the fluoropolymer latex of the topcoat is 0.1 to 10, preferably 0.7 to 5.

Hydroxyfunctional Fluoropolymer

The coating composition of the invention contains at least one hydroxyl-functional (or acid functional) fluoropolymer. The hydroxyl function can be incorporated into the fluoropolymer by several means, including but not limited to: direct copolymerization of one or more fluoromonomers with a fluorinated or non-fluorinated hydroxyfunctional monomer, incorporation by a post-polymerization reaction or grafting onto a fluoropolymer, incorporation due to a blend of a fluoropolymer with a miscible polymer containing a hydroxyl functionality.

The fluoropolymer in the coating composition could be a blend of a hydroxyfunctional fluoropolymer with one or more non-hydroxy-functional fluoropolymers. In the case of a fluoropolymer blend, at least 50 weight percent of the fluoropolymer is hydroxyfunctional, preferably at least 70 weight percent, more preferably at least 80 weight percent and even more preferably at least 90 weight percent. The fluoropolymer in the coating composition could be 100 percent hydroxyl-functional fluoropolymer.

The term "fluoromonomer" or the expression "fluorinated monomer" means a polymerizable alkene which contains at least one fluorine atom, fluoroalkyl group, or fluoroalkoxy group attached to the double bond of the alkene that undergoes polymerization. The term "fluoropolymer" means a polymer formed by the polymerization of at least one fluoromonomer, and it is inclusive of homopolymers, copolymers, terpolymers and higher polymers which are thermoplastic in their nature, meaning they are capable of being formed into useful pieces by flowing upon the application of heat, such as is done in molding and extrusion processes. The thermoplastic polymers typically exhibit a crystalline melting point.

Fluoromonomers useful in the practice of the invention include, for example, vinylidene fluoride (VDF or $VF_2$), tetrafluoroethylene (TFE), trifluoroethylene, chlorotrifluoroethylene (CTFE), hexafluoropropene (HEP), vinyl fluoride, hexafluoroisobutylene, perfluorobutylethylene (PFBP), pentafluoropropene, 3,3,3-trifluoro-1-propene, 2-trifluoromethyl-3,3,3-trifluoropropene, fluorinated vinyl ethers, fluorinated allyl ethers, non-fluorinated allyl ethers, fluorinated dioxoles, and combinations thereof. Fluoropolymers useful in the practice of the present invention include the products of polymerization of the fluoromonomers listed above, for example, the homopolymer made by polymerizing vinylidene fluoride (VDF) by itself. Copolymers, terpolymers and higher polymers of the fluoromonomers listed above, such as for example a higher polymer of vinylidene fluoride, may also be suitable employed in the practice if the invention.

Copolymers of the invention include the copolymers of VDF with TFE, HFP, or trifluoroethylene. Preferred copolymers may be those which comprise from about 71 to about 99 weight percent VDF, and correspondingly comprise from about 1 to about 29 weight percent TFE, HFP, or trifluoroethylene. Terpolymers made by the process of the invention include the terpolymer of VDF, HFP, and TFE, and the terpolymer of VDF, trifluoroethene, and TFE. Preferred terpolymers may be those which comprise at least 71 weight percent VDF, and the other comonomers may be present in varying portions which combine to comprise up to 29 weight percent of the terpolymer.

Other useful fluoropolymers include, but are not limited to polyvinyl fluoride (PVF), chlorotetrafluoroethylene (CTFE), polytetrafluoroethylene (PTFE), fluorinated polyethylene vinyl ether, and fluorinated ethylene vinyl ester (FEVE).

Fluoropolymers and copolymers may be obtained using known methods of solution, emulsion, and suspension polymerization. In one embodiment, a fluorocopolymer is formed using a fluorosurfactant-free emulsion process.

Useful hydroxyl-functional comonomers to be copolymerized with fluoromonomers include, but are not limited to, hydroxyl-group-containing (meth)acrylates, acrylic acid and acrylic esters such as alkyl(meth)acrylates, vinyl esters such as vinyl acetate that are partially or fully hydrolysed post-polymerization.

In addition to a direct copolymerization of a fluoromonomer and a hydroxyl functional monomer, other functional monomers could be copolymerized with fluoromonomers, followed by a post-polymerization reaction or reactions to induce hydroxyfuncitonality. Useful functional monomers that could be copolymerized with a fluoromonomer and post-polymerization hydroxyl-functionalized include, but are not limited to, vinyl propionate, vinyl butyrate, vinyl benzoate, maleic esters such as dimethyl maleate, diethyl maleate, di-n-propyl maleate, diisopropyl maleate, di-2-methoxyethyl maleate, fumaric esters such as dimethyl fumarate, diethyl fumarate, di-n-propyl fumarate, diisopropyl fumarate, anhydrides such as maleic anhydride, vinyl esters. Functionality could also be grafted onto a fluoropolymer, followed by a post reaction to provide a hydroxyl functionality. For example, maleic anhydride can be grafted onto a fluoropolymer using radiation, and the anhydride can be hydrolyzed to provide a hydroxy functionality.

In another embodiment, the hydroxyl-functional polymer can be a blend of a (functional or non-functional) fluoropolymer with another polymer miscible with the fluoropolymer. For example, hydroxyl-functional polyalkyl(meth)acrylates are known to be miscible with polyvinylidene fluoride in the melt. One issue with using a straight blend of fluoropolymer and miscible polymer, is that only the hydroxyl-functional polymer will chemically bond to the glass substrate through the hydroxyl-urethane linkage, and the fluoropolymer attachment is only through weaker physical entanglements. This makes for a weaker adhesive bond.

In another embodiment, a hydroxyl-functional acrylic modified fluoropolymer hybrid can be used. These acrylic fluoropolymer hybrid are formed by a latex emulsion process, using a fluoropolymer as a seed, and subsequently polymerizing one or more (meth)acrylic monomers including at least one hydroxyl-functional (meth)acrylate monomer in the presence of the fluoropolymer seeds. This forms a polymer network, where the fluoropolymer and acrylic polymer are intimately physically intertwined. Formation of these hybrid polymers is described in U.S. Pat. No. 6,680,357 and US 2011-0118403, incorporated herein by reference.

A preferred embodiment of the invention is a hydroxyl-functional acrylic modified fluoropolymer using a PVDF seed and polymerizing a hydroxyl-functional (meth)acrylate monomer in the presence of the fluoropolymer seed. The PVDF seed is preferably a copolymer of 75-95% VDF and 5-25% HFP.

Polyisocyanates

The polyisocyanates for use in the fluoropolymer top coat can be either blocked or non-blocked polyisocyanates. It is preferred to use aliphatic polyisocyanates for good weathering performance. The chosen polyisocyanate should give enough flexibility to the cured fluoropolymer top coat for good adhesion to the primer layer. In other words, the cured fluoropolymer should be a rubbery material after curing. If it is non-blocked polyisocyanate, it should be a polyisocyanate that can give sufficient time to conduct the coating process before the viscosity of the coating solution goes too high.

In the fluoropolymer coating composition, the molar ratio of the isocyanate groups to hydroxyl groups is in the range of 0.01 to 100, preferably in the range of 0.5 to 5, and more preferably in the range of 0.8 to 2.

Optional Additives

Coalescent agents, such as dipropylene glycol methyl ether acetate (DPMAc), may also be present in the top coat composition. These aid in the formation of a continuous coating on the coated substrate. The coalescent agent can also be used as a non-aqueous solvent to aid in dispersing non-blocked polyisocyanates in a multi-part coating system.

Other useful additives include, but are not limited to, pigments, dyes, wetting agents, UV absorbers, heat stabilizers, and other additives typically found in a coating composition, and at typical effective levels.

Substrate

The coating composition of the invention can be applied to a substrate, without any pretreatment (chemical or physical) of the substrate. It is preferred that the substrate is cleaned, such as cleaning glass with a window-cleaning composition, for best results. The coating could also be used with a treated substrate—though the treatment is unnecessary for good adhesion.

The coating composition can be used with any substrate having hydroxyl-surface functionality. This includes both porous and non-porous materials. Useful substrates include, but are not limited to metals, paper, wood, plastics, ceramics and all types of glass. The coating of the invention is especially useful as a means of applying a fluoropolymer coating onto glass.

The coating can be applied to the substrate by known means, including but not limited to spraying, brushing, dipping and roll coating, spin coating, curtain coating, blade coating, ink jet, etc. The coatings can be cured by baking at elevated temperatures within the range of 50-70° C. for 5-10 minutes followed by 100-180° C. for 10-30 minutes. Curing involves the evaporation of water, and the reaction between the various hydroxyl groups and NCO groups to form urethane linkages providing adhesion and cross-linking of the polymers.

The coating compositions and process based on this invention can be used in any applications where glass substrates are required. Some examples are photovoltaic edge glass coatings, fiberglass coatings, external architectural coatings such as textured & decorative coatings, structural glass walls & curtains for tall, coatings on ceramic-type materials such as porcelain and ceramic frit coated glass, etc. The claimed coating composition/method can be applied to a variety of other substrates including metals, paper, plastics, and wood. It can also be potentially used as an adhesive layer to bond fluoropolymer films to the glass.

The top coat can be applied by a variety of methods including spraying, brushing, dipping and roll coating. The topcoat can be cured by baking at elevated temperatures within the range of 50-70° C. for 5-10 minutes followed by 100-180° C. for 10-30 minutes.

Coating and Curing Process:

When using the coating composition and the process of this invention, the glass surface cleanliness is not that critical for achieving good wet adhesion. In traditional glass coating procedures, glass needs to be cleaned in several steps (including detergent and solvent wash) or with the aid of ultrasonic agitation, and then dried and used immediately to prevent further contamination of the cleaned surface. Sometimes, glass even needs to be pretreated with chemicals such as a basic solution or hydrofluoric acid or mechanically with a polishing step to create a rough surface for strong physically bonding. In the process of the invention, cleaning glass before coating application is very simple: rinse first with a detergent followed by D.I water rinse. After air drying of the cleaned glass sheets, they can be stored in a plastic bag for some time, such as a week, before the coating application. All the working examples of this invention which demonstrated excellent adhesion were based on this cleaning procedure.

In the drying and curing process, the primer is baked first, then the top fluoropolymer coating is applied, baked at a low temperature first followed by a high temperature baking as described earlier.

The cured coatings of the present invention are particularly desirable and advantageous in that they are environment friendly with very low VOC and they have excellent adhesion directly to glass (100% adhesion after 500 hrs soaking in 85° C. hot water) as well as the excellent weathering properties, chalking resistance and chemical resistance associated with fluoropolymer compositions.

The coating compositions and process based on this invention are especially useful in any applications where glass substrates are required. Some examples are coatings on flat or curved glass surface such as glass used in windows, automobiles, roofs, photovoltaics modules, lighting, displays, doors, furniture, capacitors, containers, encasing materials, bowls and plates, sculptures, etc., coatings on glass edges such as applications for preventing glass edges from further damaging or for improving glass impact strength, coating on glass edges used in thin-film photovoltaic modules including CdTe, CIGS, a-Si, a-Si/μc-Si PV technology and crystalline Silicon photovoltaic modules, and coatings on glass edges on other devices that contain one or multiple glass sheets. Examples also include coatings for glass fibers, fiberglass, external architectural coatings such as textured & decorative coatings, structural glass walls & curtains, coatings on other ceramic-type materials such as porcelain, granite, stones, bricks, concretes, and ceramic frit coated glass, etc. The claimed coating composition/method can be applied to a variety of other substrates including metals, paper, plastic, wood, and composites of any combination of the substrate materials mentioned above. It can also be potentially used as an adhesive layer to bond fluoropolymer films to the glass. One of skill in the art can easily envision similar uses for this technology, based on the descriptions and examples provided.

The coating compositions and process of the present invention are particularly desirable and advantageous in that they are environment friendly with very low VOC and they have excellent adhesion to glass (100% adhesion after 500 hrs soaking in 85° C. hot water) as well as the excellent weathering properties, chalking resistance and chemical resistance associated with fluoropolymer compositions.

EXAMPLES

The following examples are intended to illustrate further various aspects of the present invention, but are not intended to limit the scope of the invention in any aspect.

Raw Materials:

Polyvinylidene Fluoride-acrylic hybrid latex, available from Arkema Inc. as KYNAR AQUATEC RC10267.

BAYHYDROL VP LS 2239: water-dispersed hydroxy-functional polyurethane dispersion, available from Bayer Material Science.

BAYHYDUR VP LS 2240: water-dispersed blocked aliphatic polyisocyanate resin based on dicyclohexylmethane diisocyanate (H12MDI) dissolved in water/MPA/xylene, 56:4.5:4.5, available from Bayer Material Science.

3-mercaptopropyl trimethoxysilane and Aminopropyltriethoxy silanes (AmPTEOS), available from Gelest.

BAYHYDUR XP 2655: Hydrophilic aliphatic polyisocyanate based on hexamethylene diisocyanate (HDI), available from Bayer Material Science.

Formulations and Test Methods:

Each of the coating compositions was prepared by combining the ingredients listed in Table 1 with mild agitation. Each of the compositions was then applied to a clean, dry glass substrate (4 inches×4 inches) using a 8 mil square. The glass substrate was cleaned using Windex detergents followed by rinse with D.I water and drying in air prior to applying the coating composition.

The adhesion was evaluated using ASTM D3359 cross-hatch method by applying and removing pressure-sensitive tape over cuts made in the film. Each panel was crosshatched with a PAT crosshatcher. Eleven parallel cuts were made with one-tenth of an inch apart followed by parallel cuts with one-tenth of an inch apart perpendicular to and on top of the first set. The crosshatched area was then tested by firmly pressing #99 Permacel Tape over the scribed area, pulling the tape off at a 90° angle rapidly and looking for failure between the coating and the substrate. The adhesion is reported with the number of squares remaining in the scribed area. The higher the number, the better the adhesion is. For example, 100% means no pick-off of coating and 0% means all film was picked off. Both dry and wet adhesion were evaluated in this invention. The dry adhesion was tested after the coating is cured. The wet adhesion was tested after the coating was soaking in 85° C. hot water for 500 hrs.

Working Examples and Comparative Examples

The invention is explained with working examples below. In the working examples 1-3, the ratio of BAYHYDUR VP LS 2240 to BAYHYDROL VP LS 2239 was changed to vary the NCO:OH ratios. The NCO:OH ratio was close to 1 (i.e. 1.05) in example 1, 1.35 in example 2, and 0.53 in example 3. The baking conditions of the primer layer were varied based on the NCO:OH ratios. In the example 1, the primer was baked at 150° C. for 10 minutes for partial reaction of the NCO and OH groups. In the example 2, the primer was baked at 150° C. for 30 minutes for complete reaction of the hydroxyl groups in BAYHYDROL VP LS 2239. In the example 3, the primer was baked at 150° C. for 30 minutes for complete reaction of the isocyanate groups in BAYHYDUR VP LS 2240. After the baking of the primer layer, the topcoat of fluoropolymer formulation was applied. The NCO:OH ratio in the fluoropolymer coating was 1.47. After the topcoat application, the whole coating system was baked at 55° C. for 10 minutes followed by a baking at 150° C. for 30 minutes. The dry and wet adhesion test results are shown in Table 2.

There are three comparative examples listed in Table 2. The comparative example 1 is a control sample that does not contain a primer layer. In the comparative examples 2 and 3, the primer was either fully cured at 150° C. for 30 minutes or not cured at all prior to the application of the fluoropolymer coating composition.

Working examples 1-3 had 100% dry and wet adhesion after 500 hours soaking in 85° C. water. The result demonstrates that the excellent wet adhesion was achieved only when the primer coating was partially cured with remaining NCO and OH groups, or cured due to extra NCO or OH groups added prior to applying the fluoropolymer based top coat. In comparison, the comparative examples 1-2 adhered poorly to the glass when the primer was not applied or when the primer was completed cured with no remaining NCO or OH groups. The comparative example 3 showed that for blocked isocyanate used in the primer, the primer has to be baked to release the blocking agent for good wet adhesion.

TABLE 1

Coating compositions of primer and topcoat listed as parts by weight.

| Primer Formulation | 1 | 2 | 3 |
|---|---|---|---|
| Bayhydrol VP LS 2239 | 19.6 | 9.8 | 19.6 |
| EnviroGem AD01 | 1.4 | 1.4 | 1.4 |
| Surfynol 465 | 1.4 | 1.4 | 1.4 |
| Bayhydrol VP LS 2240 | 72.9 | 72.9 | 36.4 |
| 20% Irganox 1010 in MIAK | 2.7 | 2.7 | 2.7 |
| dipropylene glycol | 1.5 | 1.5 | 1.5 |
| AmPTEOS | 0.2 | 0.2 | 0.2 |
| 3-mercaptopropyltrimethoxysikane | 0.2 | 0.2 | 0.2 |
| Total | 99.9 | 90.1 | 63.4 |
| NCO:OH | 1.05 | 1.35 | 0.53 |

| Fluoropolymer Topcoat Formulation | |
|---|---|
| | part by weight |
| Part A | |
| Kynar Aquatec RC10267 latex (44 wt %) | 593 |
| 28% Amonia (neutralize agent) | 1.8 |
| Byk 346 (wetting agent) | 0.6 |
| Coapur XS-52:H2O (1:2) (thickener) | 4.4 |
| Part B | |
| Bayhydur XP2655 | 24 |
| DPMAc | 6 |
| Total | 630 |
| NCO:OH | 1.47 |

TABLE 2

Working examples and Comparative examples

| | | Primer | | topcoat | | Adhesion | |
|---|---|---|---|---|---|---|---|
| | | formulation | baking | formulation | baking | dry | wet (500 hrs soaking in 85 C. water) |
| Comparative Examples | 1 | no | | yes | 55 C., 10 minutes, followed by 150 C., 30 minutes | 0 | 0 |
| | 2 | 1 | 150 C., 30 minutes | yes | 55 C., 10 minutes, followed by 150 C., 30 minutes | 90 | 0 |
| | 3 | 1 | no | yes | 55 C., 10 minutes, followed by 150 C., 30 minutes | 50 | 0 |

TABLE 2-continued

Working examples and Comparative examples

| | | Primer | | topcoat | | Adhesion | |
| --- | --- | --- | --- | --- | --- | --- | --- |
| | | | | | | | wet (500 hrs soaking |
| | formulation | baking | formulation | baking | | dry | in 85 C. water) |
| Working Examples | 1 | 1 | 150 C., 10 minutes | yes | 55 C., 10 minutes, followed by 150 C., 30 minutes | 100 | 100 |
| | 2 | 2 | 150 C., 30 minutes | yes | 55 C., 10 minutes, followed by 150 C., 30 minutes | 100 | 100 |
| | 3 | 3 | 150 C., 30 minutes | yes | 55 C., 10 minutes, followed by 150 C., 30 minutes | 100 | 100 |

What is claimed is:

1. A process for forming a fluoropolymer coating on a substrate comprising the steps of:
   a) coating said substrate on at least one side or at least one edge with a primer composition comprising:
      1) at least one hydroxy-functional polyurethane,
      2) at least one polyisocyanate,
      3) at least one organosilane coupling agent,
      4) optionally an antioxidant
      5) optionally one or more additives selected from the group consisting of coalescent agents, pigments, dyes, wetting agents, UV absorbers, and heat stabilizers;
   b) curing said primer composition to leave 15-90% of unreacted isocyanate or hydroxyl functional groups;
   c) coating said primered substrate with an aqueous hydroxy-functional fluoropolymer composition comprising:
      1) a hydroxy-functional fluoropolymer,
      2) a hydrophilic aliphatic polyisocyanate,
      3) optionally one or more additives selected from the group consisting of pigments, coalescent agents, wetting agents, UV absorbers, an d heat stabilizers; and
   d) curing said coated substrate.

2. The process of claim 1, wherein said substrate is a glass substrate.

3. The process of claim 1, wherein said organo silane coupling agent comprises a blend of 3-mercaptopropyl trimethoxysilane and aminopropyltriethoxy silane.

4. The process of claim 3, wherein the ratio of 3-mercaptopropyl trimethoxysilane to aminopropyltriethoxy silane is from 0.9:1 to 1:0.9.

5. The process of claim 1, wherein said hydroxyl-functional fluoropolymer is a fluoropolymer-acrylic hybrid polymer.

6. The process of claim 1, wherein said polyisocyanate in said primer coating composition comprises one or more blocked-polyisocyanate.

7. The process of claim 1, wherein said isocyanates in both the primer and the fluoropolymer coating compositions comprise aliphatic polymeric or aliphatic oligorneric isocyanates based on bis-(4-isocyanatocyclohexyl)methane ($H_{12}MDI$) and/or hexamethylene diisocyanate (HDI).

8. The process of claim 1, wherein said polyisocyanates in the primer coating composition contain NCO end groups, and the ratio of the total NCO groups to said total hydroxyl groups on the hydroxyl-functional polyurethane is from 0.4 to 2.

9. The process of claim 8, wherein said polyisocyanates in the fluoropolymer coating composition contain NCO end groups, and the ratio of the total NCO groups to said total hydroxyl groups on the hydroxyl-functional fluoropolymer and the polyol is from 0.8 to 2.

10. The process of claim 1, wherein said primer coating is cured partially 120-160° C. for 1-15 minutes if the NCO:OH ratio is between 0.9-1.1.

11. The process of claim 1, wherein said primer coating has a NCO:OH ratio of either between 0.4-0.9 or 1.1-2, and wherein full consumption of the functional groups (isocyanate or hydroxyl groups) that are less in the composition occurs on curing.

12. The process of claim 6, wherein said blocked-polyisocyanate is baked at a high temperature of from 80-180° C. for 0.1-15 minutes to release the blocking agent before applying the fluoropolymer coating for good adhesion of the coating to the substrate.

* * * * *